United States Patent
Pleros et al.

(10) Patent No.: US 11,204,326 B2
(45) Date of Patent: Dec. 21, 2021

(54) INTEGRATED PLASMO-PHOTONIC BIOSENSOR AND METHOD OF USE

(71) Applicants: Aristotle University of Thessaloniki-Research Committee E.L.K.E., Salonika (GR); AMO GmbH Gesellschaft für Angewandte Mikro- und Optoelektronic Mit Beschränkter Haftung, Aachen (DE)

(72) Inventors: Nikolaos Pleros, Salonika (GR); Dimitrios Tsiokos, Salonika (GR); Georgios Ntampos, Salonika (GR); Dimitra Ketzaki, Salonika (GR); Anna-Lena Giesecke, Aachen (DE)

(73) Assignees: Aristotle University of Thessaloniki-Research Committee E.L.K.E, Salonika (GR); AMO GmbH Gesellschaft für Angewandte Mikro- und Optoelektronic Mit Beschränkter Haftung, Aachen (DE)

( * ) Notice: Subject to any disclaimer, the term of this patent is extended or adjusted under 35 U.S.C. 154(b) by 0 days.

(21) Appl. No.: 16/486,871

(22) PCT Filed: Feb. 20, 2018

(86) PCT No.: PCT/GR2018/000007
§ 371 (c)(1),
(2) Date: Aug. 19, 2019

(87) PCT Pub. No.: WO2018/150205
PCT Pub. Date: Aug. 23, 2018

(65) Prior Publication Data
US 2020/0003696 A1    Jan. 2, 2020

(30) Foreign Application Priority Data

Feb. 17, 2017 (GR) .............................. 2017/0100088

(51) Int. Cl.
*G01N 21/77* (2006.01)
*G02B 6/12* (2006.01)
(Continued)

(52) U.S. Cl.
CPC ....... *G01N 21/7703* (2013.01); *G01N 1/2205* (2013.01); *G02B 6/1226* (2013.01)

(58) Field of Classification Search
None
See application file for complete search history.

(56) References Cited

U.S. PATENT DOCUMENTS

2005/0018949 A1    1/2005  Yan
2006/0045809 A1*   3/2006  Shirai ................ G01N 21/554
                                                    422/82.11
(Continued)

FOREIGN PATENT DOCUMENTS

EP    2214049 A1    8/2010
WO    0073848 A2   12/2000

OTHER PUBLICATIONS

Alam, M.Z. et al., "Analysis and Optimization of Hybrid Plasmonic Wavgeguide as a Platform for Biosensing", IEEE Photonics Journal, IEEE, USA, vol. 6, No. 4, Aug. 1, 2014.
(Continued)

*Primary Examiner* — Michael Stahl
(74) *Attorney, Agent, or Firm* — James Creighton Wray

(57) ABSTRACT

The invention relates to a device comprising a first optical Mach-Zehnder interferometric sensor (MZI1) with a large FSR, wherein a plasmonic waveguide (107) thin-film or hybrid slot, is incorporated as transducer element planar integrated on Si3N4 photonic waveguides and a second optical interferometric Mach-Zehnder (MZI2), both comprising thermo-optic phase shifters (104, 106) for optimally
(Continued)

biasing said MZI sensor (MZI1) and MZI as variable optical attenuator VOA. It further comprises an overall chip (112), being remarkable in that it comprises a set of Photonic waveguides (103) with a high index silicon nitride strip (303, 603), which is sandwiched between a low index oxide substrate (SiO2) and a low index oxide superstrate (LTO); Optical coupling structures (102, 109) at both ends of the sensor acting as the optical I/Os; an Optical splitter (102) and an optical combiner (109) for optical splitting at the first junction (102) of said first sensor (MZI1) and optical combining at the second junction (109) of said first MZI (MZI1); a variable optical attenuator (VOA) with said additional second MZI (MZI2), which is nested into said MZI1 (sensor)), deploying an optical splitter and an optical combiner for optical splitting at the first junction of said additional second MZI (MZI2), and optical combining at the second junction of said second MZI (MZI2); a set of Thermo-optic phase shifters (104, 106) to tune the phase of the optical signal in the reference arm (104, 106) of each said MZI (MZI1, MZI2-VOA); wherein Thermo-optic phase shifters are formed by depositing two metallic stripes parallel to each other on top of a section of the photonic waveguide and along the direction of propagation of light; and a plasmonic waveguide (107) in the upper branch (103) of said first MZI (MZI1), that confines light propagation through coupling to Surface Plasmon Polaritons (SPP) at the metal-analyte interface, and method associated thereto.

22 Claims, 9 Drawing Sheets

(51) Int. Cl.
*G01N 1/22* (2006.01)
*G02B 6/122* (2006.01)

(56) References Cited

U.S. PATENT DOCUMENTS

| | | | |
|---|---|---|---|
| 2008/0056640 A1* | 3/2008 | Koo | B82Y 20/00 385/12 |
| 2008/0158563 A1 | 7/2008 | Berini | |
| 2008/0267555 A1* | 10/2008 | Kashyap | G01N 21/553 385/12 |
| 2009/0214159 A1* | 8/2009 | Hyun | B82Y 20/00 385/14 |
| 2010/0316325 A1* | 12/2010 | Okamoto | B82Y 20/00 385/3 |
| 2011/0188047 A1* | 8/2011 | Levy | G01D 5/266 356/477 |

OTHER PUBLICATIONS

Clark, Stewart A. et al., "Thermo-Optic Phase Modulators in SIMOX Material", Proceedings of SPIE, Jan. 1, 2000.
Homola, Jiri et al., "Surface Plasmon Resonance Sensors: Review", Sensors and Actuators B, Chemical vol. 54, Jan. 25, 1999.
Gao, Yongkang et al., "Plasmonic Mach-Zehnder Interferometer for Ultrasensitive On-Chip Biosensing", ACS NANO, Dec. 2011.
Sun, Xu et al., "High-Sensitivity Liquid Refractive-Index Sensor based on a Mach-Zehnder Interferometer with a Double-Slot Hybrid Plasmonic Waveguide", Optics Express, vol. 23, Issue 20, Sep. 22, 2015.
Wo, Jianghai et al., "Refractive Inde Sensor using Microfiber-Based Mach-Zehnder Interferometer", Optics Letters, Optical Society of America, Jan. 2, 2012.
Zinoviev, Kirill E. et al., "Integrated bimodal Waveguide Inferferometric Biosensor for Label-Free Analysis", Journal of Lightwave Technology, vol. 29, No. 13, Jul. 1, 2011.

* cited by examiner

INTEGRATED PLASMO-PHOTONIC BIOSENSOR AND METHOD OF USE

FIELD OF THE INVENTION

The present invention relates to a device for low-cost mass manufacturing of planar integrated photonic biosensors and more specifically to monolithic co-integration of CMOS photonics and plasmonic components into optimally biased MZI interferometers as the means to increase the sensor's sensitivity to unprecedented levels and at low manufacturing cost.

PRIOR ART

Several solutions have been proposed to address the technical problems of high-sensitivity biosensing. However, broad commercial exploitation is still hampered by complex and expensive fabrication methods required, large footprints of systems or moderate sensitivities. All those characteristics should be simultaneously addressed in a sensing device before this reaches the market.

The sensitivity of the surface plasmon resonance (SPR) to the refractive index change due to the strong optical field at a metal surface has led to the development of SPR sensing systems for the detection of biological agents, referred to by Jiři Homola, Sinclair S. Yeea, Günter Gauglitzb in "Surface plasmon resonance sensors: review", Sensors and Actuators B: Chemical Volume 54, Issues 1-2, 25 Jan. 1999, Pages 3-15. Those use typically an optical prism to couple light into a surface plasmon mode on a flat gold film. However, the large size of those systems is a major obstacle for their miniaturization in planar monolithic chips for low-cost manufacturing and their use in point-of-care and other portable applications.

Exploiting recent advances in nano-fabrication, plasmonic waveguide devices hosting propagating surface plasmon polaritons were integrated as biosensors, yet with low sensing performance in terms of sensitivity. To enhance performance of plasmonic sensors, plasmonic waveguides were integrated in Mach-Zehnder interferometers, designated as "MZI", and other interferometric configurations to exploit phase dependence of the optical field at the plasmonic waveguide to changes in refractive index of analyte under test. The paper in OSA-Optics Express, Vol. 23, Issue 20, pp. 25688-25699 (2015), doi.org/10.1364/OE.23.025688 [Wosinski] demonstrates a Mach-Zehnder interferometer with a gold-based slot waveguide integrated on silicon. However, the lack of optimal biasing components to optimize differential length and power imbalance between the upper and lower branch in combination with the small FSR of the MZI has led to an optical sensitivity of the order of 1061/nm/RIU. A similar approach was proposed in the paper of IEEE-Photonics Journal, being referred to herewith by M. Z. Alam, F. Bahrami, J. S. Aitchison and M. Mojamedi, 'Analysis and Optimization of Hybrid Plasmonic Waveguide as a Platform for Biosensing Volume: 6, Issue: 4, August 2014, DOI: 10.1109/JPHOT.2014.2331232, using hybrid plasmonic slot waveguides however the design focuses on the plasmonic waveguide lacking any MZI balancing components and associated performance indicators.

Patent document US2005/0018949 A1 discloses a MZI sensor using plasmonic yet applied in micrometer scale dimensions (2-20 µm) only, but not beyond, thus merely allowing a micrometer scale integration, and not more. In addition, the efficiency of the coupling between the plasmonic and the photonic waveguide in said document is not disclosed, while this is expected to be low, introducing very high losses at the branch of the MZI where the plasmonic waveguide is integrated. This, in parallel to the absence of biasing components at the lower branch of the MZI, which is thus not disclosed in said document is expected to result in low resolution during the sensing measurement and therefore limit the sensor's sensitivity and limit of detection.

Patent EP 2 214 049 B1 uses a specially designed photonic MZI relying on the evanescent optical field yet requiring very long interaction arms in MZI sensing branch. This, in combination with the use of CMOS incompatible materials like polymers prohibit further miniaturization of this apparatus in micro- or nanoscale and mass manufacturing in CMOS plants. Similarly, to the abovementioned apparatuses, this sensor also does not use the balancing component required to perfectly balance the MZI sensor while to meet sensitivity requirements it requires a large sensor configuration that limits mass manufacturing and therefore cost reduction of the sensing chip fabrication.

A new type of interferometer, called BiModal Interferometer, being referred to herewith by Yongkang Gao, Qiaoqiang Gan, Zheming Xin, Xuanhong Cheng, Filbert J Bartoli, in "Plasmonic Mach-Zehnder Interferometer for Ultrasesnitive on-chip Biosesning", ACS Nano 2011 Dec. 18; 5(12):9836-44. Epub 2011 Nov. 18; and resp. Kirill E. Zinoviev; Ana Belén Gonzalez-Guerrero; Carlos Dominguez; Laura M. Lechuga, in "Integrated Bimodal Waveguide Interferometric Biosensor for Label-Free Analysis", Journal of Lightwave Technology Year: 2011, Volume: 29, Issue: 13, Pages: 1926-1930, DOI: 10.1109/JLT.2011.2150734, has also been investigated using both photonic and plasmonic structures targeting enhanced thermal stabilities and/or deviation from the ideal 50:50 splitting ratios. Although they offer compact solutions, the requirement for bi-modal operation impedes elongation of the sensing area and accurate balancing of the two MZI branches for optimized resolution.

A micro-fiber based refractive index sensor using MZI configuration was reported in the paper of OSA-Optics Letters being referred to herewith by Jianghai Wo et al, in "Refractive index sensor using microfiber-based Mach-Zehnder interferometer", Vol. 37, Issue 1, pp. 67-69 (2012), doi.org/10.1364/OL.37.000067. The proposed layout exploits optical fibers, manually controlled off-the-shelf optical delay line and attenuator components to optimize the MZI sensor operation as well as a 6 cm optical micro-fiber. In this paper, a method to develop the proposed layout in a planar integrated chip and to realize the attenuator and delay line in an integrated format is not disclosed. In addition, the use of a 6 cm long micro-fiber as the sensor transducer does not allow further miniaturization (millimeter or micrometer scale) and mass manufacturing.

Authors of paper being referred to herewith Stewart A. Clark, Brian Culshaw, Emma J. C. Dawnay, Ian E. Day, "Thermo-optic phase modulators in SIMOX material", Proc. SPIE 3936, Integrated Optics Devices IV, (24 Mar. 2000); doi: 10.1117/12.379940; disclose a method to exploit planar, electrically controlled thermo-optic phase shifters as phase modulating elements in MZI configurations. A similar approach combining electrically controlled phase modulators in a nested MZI configuration was also disclosed in WO 00/73848 A2 (JDS UNIPHASE CORP [US]; McBrien Gregory J [US]; Kissa Karl M [US]; Hal) 7 Dec. 2000 (2000 Dec. 7). However, no sensing elements nor sensing functionalities are proposed in neither scheme.

WO 00/73848 A2 discloses esp. in FIG. 3 a nested Mach-Zehnder configuration with electrodes controlling the phase and balance of the field in the arms of the interferometer. However, the device as disclosed is a modulator and not a sensor and furthermore does not contain thermo-optic phase shifters.

Aim of the Invention

The present invention aims to address the various issues above simultaneously by proposing an ultra-sensitive biosensor device that can be integrated in micrometer scale chip-based configurations by using simple and low-cost fabrication methods.

Sensing technologies, which will be able to accurately—down to molecular level—read in real-time the targeted substances, will boost early diagnosis and prevention of diseases, point of care applications and accurate environmental monitoring. Plasmonics is a technology with immense potential when applied in sensing due to its ability to confine light in nanometer scale dimensions offering excellent sensitivity versus interaction length relation. The unprecedented sensitivities per unit length of plasmonics, along with their ability to harmonically co-exist with low loss photonics, electronics—nm-scale and metal nature—and bio-chemical mechanisms (biocompatible) will unleash new capabilities in biosensor systems in terms of performance, multi-functionality and compactness.

In parallel, selectively combining plasmonic waveguides with $Si_3N_4$ based photonics may exploit CMOS back-end fabrication processes of electronic IC factories to bring integrated photonic sensors closer to low-cost and mass manufacturing. Although the added value of plasmonics has been practically confirmed, an organized effort to transform integrated plasmonic sensors from a highly lossy and isolated technology into a high valued practical CMOS-compatible device is yet unseen. Concisely, a harmonic and balanced mixture of CMOS compatible plasmonics with photonics in integrated planar chips is expected to transform plasmo-photonic sensors from an expensive and complicated technology to a true technological revolution in photonic integrated circuits (PIC)-based sensors offering unprecedented performances and functionalities in large scale and throughout a diverse set of industrial needs.

The present invention thus aims to address the need for an integrated, i.e. compact, sensing apparatus (chip) with unprecedented optical sensitivity, tentatively of the order of 150000 nm/RIU, using plasmonic waveguides in optimally balanced photonic MZ interferometers with large wavelength FSR particularly ranging from 10s of nanometers to many 100s of nanometers that can be fabricated at a low cost and in mass production using CMOS manufacturers, notably monolithic integration, typically used for electronic integrated circuits. In this perspective, the sensor design, a component manufacturing methodology, resp. device and a sensing method are proposed according to the invention.

In addition, this invention proposes an optical Mach-Zehnder interferometric MZI biosensor that exploits nanometer scale $Si_3N_4$ photonic waveguides and nanometer scale plasmonic waveguides planarly integrated on a CMOS chip. The invention targets the detection of chemical and/or physical quantities by exploiting the well-known refractive index change taking place at the plasmonic waveguide section of the interferometer when the analyte or gas under test covers the plasmonic waveguide. An additional, i.e. second, Mach-Zehnder interferometric MZI is used along with optical phase shifters as variable optical attenuator VOA, and stand-alone phase shifters are included in one branch, whereby lower branch of the interferometer in order to optimally balance the sensor and achieve measurement sensitivity well below what is achievable with the state of the art. Sensor design is combined with low-cost materials and fabrication processes enabling mass manufacturing.

The invention addresses a low-cost mass manufacturing method of ultra-sensitive biosensor chips used for the detection of chemical, biochemical or other physical quantities present in liquids or gases.

SUMMARY OF THE INVENTION

There is thus proposed according to the present invention an ultra-sensitive biosensor apparatus with the aid of photonic and plasmonic waveguides arranged in a specially designed MZI configuration that can be fabricated at low cost and in mass manufacturing plants. Esp. an apparatus comprising photonic and new plasmonic components for nanometer scale integration is proposed according to the invention.

According to a main embodiment of a device according to the invention, it comprises an optical interferometric sensor, being a Mach-Zehnder interferometric MZI sensor with a large wavelength FSR starting from few 10s of nanometers to several 100s of nanometers, wherein a plasmonic waveguide, particularly thin-film or hybrid slot, is incorporated as a transducer element planar integrated on $Si_3N_4$ photonic waveguides, further comprising
- a set of Photonic waveguides with a high index silicon nitride strip, which is sandwiched between a low index oxide substrate $SiO_2$ and a low index oxide superstrate LTO
- Optical coupling structures at both ends of the sensor acting as the optical I/Os;
- an Optical splitter and an optical combiner for optical splitting at the first junction of said MZI sensor and optical combining at the second junction of said first MZI sensor, particularly a Y-junction, directional coupler or multi-mode interference coupler (MMI); and
- a plasmonic waveguide developed in the upper branch of said sensor, that confines light propagation through coupling to Surface Plasmon Polaritons (SPP) at the metal-analyte interface.

Said device remarkably comprises a further optical remarkably interferometric element of the Mach-Zehnder type which is arranged in the reference arm of said MZI sensor, both said MZIs elements comprising thermo-optic heaters for optimally biasing both said interferometers, further comprising an overall chip, a variable optical attenuator VOA with said additional MZI, deploying an optical splitter and an optical combiner for optical splitting at the first junction of said additional MZI, and optical combining at the second junction of said additional MZI,
- a set of Thermo-optic phase shifters to tune the phase of the optical signal in the reference arm of each said MZI; wherein said Thermo-optic phase shifters are formed by depositing at least on or two metallic stripes parallel to each other on top of a section of the photonic waveguide and along the direction of propagation of lights.

The device according to the invention therefore differs from the closest prior art in that it comprises these several features mentioned above as remarkable, notably said further Mach-Zehnder type, optical interferometer, both including thermo-optic heaters as biasing units of said interferometers, as variable optical attenuator; said VOA with said additional MZI2 nested into said MZI1 sensor; and a set of Thermo-optic phase shifters.

These features involve a technical effect consisting of being the further interferometer MZI2 being nested into the first sensor, having a thermo-optic phase shifter in its reference arm, which MZI2 acts as a variable optical attenuator VOA controlled by the driving signal of the thermo-optic phase shifter. This VOA controls the intensity of the signal in the reference arm of the first interferometric sensor. The further thermo-optic shifter in the reference arm of the first interferometric sensor allows to control the phase of the beam in said reference arm. The control of phase and amplitude of the field in the reference arm of the interferometer MZI1 is therefore possible, so that MZI1 may be balanced and biased by electrical signals at the desired working point.

The problem to be solved over said closest prior art XP011552586 is therefore to control the balance and bias point of the interferometric sensor. The solution provided thanks to the device proposed according to the invention is remarkable in that a VOA and a phase shifter in the reference arm for controlling the bias point of an interferometric sensor are yet disclosed by XP001572448 of JIANGHAI WO ET AL being referred herewith to the "tunable ODL" and the attenuator in FIG. 1 and related text. The latter document however discloses neither the tunable ODL as including a thermo-optic phase shifter nor the attenuator being made by a Mach-Zehnder interferometer including a further thermo-optic element. This document thus yet discloses a solution to the technical problem, but without the missing features of said abovementioned main embodiment of the invention, however. Indeed, unlike the planar technology of said closest prior art XP011552586 referred to as the interferometer of XP001572448 is based on optical fibers. It is thus not suggested therein on how to implement the tunable delay and attenuator of this further document into the planar waveguide sensor of the said closest prior art referred to. The implementation of phase shifters in planar waveguide technology involving thermos-optic elements is disclosed by XP55414114, together with variable optical attenuators in the Mach-Zehnder configuration containing thermo-optic elements, being referred to the cited passages thereof. To conclude, one should implement in the said closest prior art XP011552586, to arrive at the invention, the functions of the optical fiber components of this further document obtained with the planar waveguide technology of XP55414114.

An aspect of the invention is its capability to provide optical sensitivities, such as optical resonance shift versus unit change of refractive index above the plasmonic waveguide, above the yet existing prior art devices by exploiting the strong light-matter interaction of the SPP waveguide in large Free Spectral Range (FSR) (from 10s of nanometers to many 100s of nanometers) and optimally biased MZ interferometric configurations. The smaller the optical path difference between the sensing and the reference arm of the interferometer, the larger the FSR it becomes, resulting in higher interferometer sensitivity to the refractive index of the analyte under test on the plasmonic waveguide. The overall configuration and optimal biasing method is proposed according to the invention.

Another aspect of the present invention is the method for the monolithic integration of nanometer scale SPP waveguides (thin-film or hybrid photonic slot), silicon nitride photonic waveguides and thermo-optic phase shifters implemented by metallic heaters in a nested MZ interferometric configuration in order to achieve record-high sensitivity simultaneously with low cost fabrication.

Yet another aspect of this invention is the monolithic integration of nanometer scale SPP waveguides (thin-film or hybrid photonic slot), nanometer scale silicon nitride photonic waveguides and thermo-optic phase shifters in compact MZI configurations using CMOS compatible materials (oxides, metals, dielectrics) and methods enabling mass manufacturing of the sensor chip at low cost.

The present invention also relates to a device, notably wherein another aspect of the invention is the design of the photonic and plasmonic waveguide, particularly for the case where the hybrid slot SPP waveguide is deployed, that allow the simultaneous deposition of plasmonic slot waveguide and thermo-optic phase shifter metal contacts in a single mask and lift-off process and with the same metal further reducing the overall cost of the fabrication.

A still further aspect of this invention is to provide an ultra-sensitive biosensor array apparatus with the aid of wavelength division multiplexing WDM technology and photonic and plasmonic waveguides arranged in arrays of specially designed MZI configurations that can be fabricated at low cost and in mass manufacturing plants. The array will be able to simultaneously detect multiple physical quantities from the testing analyte or gas with the same sensitivities and fabrication cost as the single biosensor apparatus.

To summarize, there is provided thanks to the invention an apparatus comprising photonic and new plasmonic components for nanometer scale integration, in contrast with the formerly cited document US2005/0018949 A1 merely allowing a micrometer scale integration, and not more. In addition, the efficiency of the coupling between the plasmonic and the photonic waveguide in said document is not disclosed while this is expected to be low, introducing very high losses at the branch of the MZI where the plasmonic waveguide is integrated. This, in parallel to the absence of biasing components at the lower branch of the MZI, which is thus not disclosed in said document, which is provided however thanks to the invention. It is expected to result in low resolution during the sensing measurement and therefore limit the sensor's sensitivity and limit of detection. The above issues should in practice be achieved using monolithic integration and nanometer scale geometries in order to be able to fabricate miniaturized sensing chips at a low cost. Those issues are solved thanks to the invention, by disclosing how an MZI sensor comprising plasmonic sensing elements and additional photonic MZI and phase shifters to perfectly balance a MZI for ultra-sensitive sensing at a low manufacturing cost using monolithic integration.

The deployment of an additional MZI in the reference arm of MZI 1 and phase shifters (metallic heaters) are used to obtain perfectly balanced interference at the output prior to the sensing measurement maximizing extinction ratio and limit of detection. According to a preferred embodiment of the invention, the above is combined with large FSR MZI (FSR from 10s of nanometers to many 100s of nanometers) configuration as a method to achieve ultra-high sensitivities and sensing performance that address current and future needs.

In addition, there is provided according to additional embodiments of the invention, specific components that reduce overall fabrication cost involving less etching and lift-of steps, including single etch photonic waveguide (strip) along with single lift-off step plasmonic waveguides. In addition, there is provided a design method of the integrated MZI plasmo-photonic sensor that can increase sensitivity levels above those of the prior art combined with low cost manufacturing.

According to specific embodiments of the device according to the present invention, said plasmonic waveguides are made with noble metals such as gold (Au) or silver (Ag); possibly also low cost metals such as copper (Cu), aluminum (Al), titanium nitride (TiN) or other CMOS compatible metal.

According to a further embodiment/s of the device according to the present invention, said plasmonic waveguides are made with either of the following two waveguides:
- a "Thin-film waveguide" (TFW) that consists of a thin metallic stripe deposited directly onto the oxide superstrate with the aid of a cavity formed by etching the top oxide cladding and the silicon nitride core of the photonic waveguide in that section only or
- a "Hybrid plasmo-photonic slot waveguide" (HPPSW) that comprises two parallel metallic wires deposited directly on top of a predefined section of the waveguide without the need for a cavity or additional processing steps wherein the photonic waveguide underneath the metallic stripes is interrupted during lithography without additional mask or processing steps, wherein the plasmonic slot and phase shifters deposited directly on top of the photonic waveguides and at a single step without etching of the photonic waveguide and with single metal layer deposition step, more particularly wherein Values of the separation of the metals stripes (distance $W_{slot}$) and the metal stripes length and width are defined during the mask design of the sensor in order to design both the HPPSW and the thermos-optic phase shifter (heater) in a single mask, yet more particularly wherein Directional coupling is included to couple light from the photonic waveguide to the plasmonic slot and back to the photonic waveguide Plasmonic taper at the front and rear-end of the plasmonic slot are also used for improved coupling efficiency.

The present invention also relates to an apparatus comprising arrays of devices as proposed above, wherein it allows for concurrent detection of multiple substances on the same chip, wherein said apparatus comprises multiples of the upper branches with plasmonic waveguides and the same copies of lower branches with heaters and VOAs wherein A common optical splitter and a common combiner are arranged at input and output of the chip respectively for all MZIs, wherein each MZI sensor uses a separate wavelength out of equal number of wavelengths that are simultaneously injected in the biosensor through the optical splitter, wherein each MZI also comprises of optical filters at the input of its branches and after the input splitter to select its wavelength of operation from the incoming optical signals, particularly wherein said optical filters or other optical filters with similar functionality like AWGs consist of Ring resonators.

According to more specific embodiments of the device according to the present invention, it is made with other CMOS compatible photonic materials like Si and Silicon on Insulator (SOI), $TiO_2$; resp. made with still other CMOS compatible metal materials like Al, Cu, TiN or also compounds of those materials.

According to an additional embodiment/s of the device according to the present invention, it includes bidirectional vertical optical grating couplers that are arranged instead of other optical I/Os and splitter combiner of said first sensor (MZI1) to simultaneously act as vertical I/Os and splitter combiner of said first sensor (MZI1).

According to a particular embodiment/s of the device/$8_o$ according to the present invention, integrated optical sources, particularly VCSELs, LEDs, broadband sources or other optical sources and optical photodetectors, are arranged at the inputs and outputs of the apparatuses respectively, more particularly wherein the optical source and photodetectors are integrated using flip-chip or wafer bonding or die bonding or epitaxial growth methods above the grating coupler or on the same level of the photonic waveguide.

According to a still further embodiment/s of the device according to the present invention, arrays of integrated optical sources and optical detectors are arranged at the inputs and outputs of the apparatuses, particularly wherein the optical source and photodetectors are integrated using flip-chip or wafer bonding or die bonding or epitaxial growth methods above the grating coupler or on the same level of the photonic waveguide.

According to a remarkable embodiment of the device according to the invention, it comprises vertical electrical vias also known as TSVs, which are connected to and electrically control the thermo-optic phase shifters by an electronic circuit 3D integrated on the same chip.

According to a further remarkable embodiment of the device according to the present invention, it comprises an additional fluidic channel, which is attached on the surface of the plasmonic waveguide to flow a predetermined solution/analyte on the plasmonic transducer element.

According to a quite remarkable embodiment of the device according to the present invention, additional capture layers are generated at the surface of the plasmonic transducer for detection of specific biological and/or chemical substances and/or molecules.

The present invention also relates more specifically to monolithic co-integration of CMOS photonics and plasmonic components into optimally biased MZI interferometers as the means to increase the sensor's sensitivity to unprecedented levels and at low manufacturing cost.

The present invention also relates to a method for use of the device as set out above, particularly, wherein additional unfunctionalized plasmonic waveguides of the same dimensions are fabricated on the lower branch of said sensor or respective equivalent in the said MZI array resp., particularly wherein the targeted analyte is guided to flow over this additional waveguide similarly to the functionalized waveguide on the top branch of said sensor and wherein unwanted binding or noise is eliminated.

According to a main embodiment of the method for use of the device according to the present invention, it is remarkable in that it comprises the following steps additionally:
- optimally biasing said interferometers MZI as variable optical attenuator by said thermo-optic heaters comprised in both said interferometers of the Mach-Zehnder type,
- deploying an optical splitter and an optical combiner for optical splitting at the first junction of said additional second interferometer, by a variable optical attenuator (VOA) with said additional second interferometer nested into said first sensor, and optically combining at the second junction of said second interferometer,
- tuning the phase of the optical signal in the reference arm of each said interferometer (MZI1, MZI2)-(VOA) by said thermo-optic phase shifters; depositing two metallic stripes parallel to each other on top of a section of the photonic waveguide and along the direction of propagation of light, whereby thermo-optic phase shifters are formed;

by which said additional optical interferometer nested into said first optical interferometric sensor, having the thermo-optic phase shifter in its reference arm, acts as variable optical attenuator (VOA), which is controlled by the driving signal of the thermo-optic phase shifter, wherein this (VOA) controls the intensity of the signal in said reference arm of the first interferometric sensor, whereas said additional thermo-optic shifter in the reference arm of the first interferometric sensor allows to control the phase of the beam in said reference arm, thus allowing the control the amplitude and phase of the field in the reference arm of said first interferometer sensor, so that said interferometer sensor may be balanced and biased by electrical signals at the desired working point.

According to a further embodiment of the Method according to the present invention, additional unfunctionalized plasmonic waveguides of the same dimensions are fabricated on the lower branch of said first sensor or respective equivalent in the MZI array, particularly wherein the targeted analyte will flow over this additional waveguide similarly to the functionalized waveguide on the top branch of said first sensor and unwanted binding or noise is eliminated.

In short, there is thus provided thanks to the invention a method for low-cost mass manufacturing of an integrated plasmo-photonic biosensor for ultra-high sensitivity and device therefor.

Further features of the invention are defined in corresponding subclaims.

Some exemplary embodiments of the present invention are described more in detail in conjunction with the accompanying drawings. It should be noted that the embodiments in this invention and features in the embodiments can be mutually combined with each other within the scope of the present application.

BRIEF DESCRIPTION OF THE DRAWINGS

FIG. 7 shows a spectral shifting of the resonant peak of the sensor MZI designed with FSR 1164 nm, whereas

DESCRIPTION

At first, a circuit embodiment is described more in detail hereafter. The device of the invention includes an optical interferometric biosensor particularly of the Mach-Zehnder type MZI that exploits nanometer scale $Si_3N_4$ photonic waveguides and nanometer scale plasmonic waveguides planarly integrated on a CMOS chip. The method of the invention includes the detection of chemical and/or physical quantities by exploiting a known refractive index change taking place at the plasmonic waveguide section of the interferometer when the analyte or gas under test is attached on it. An additional MZI, e.g. a second optical interferometric Mach-Zehnder MZI2, is used along with optical phase shifters as variable optical attenuator VOA and stand-alone phase shifters are included in one branch, particularly lower branch of the interferometer in order to optimally balance the sensor and achieve measurement sensitivity. Sensor design is combined with low-cost materials and fabrication processes enabling mass manufacturing.

Figure 1:
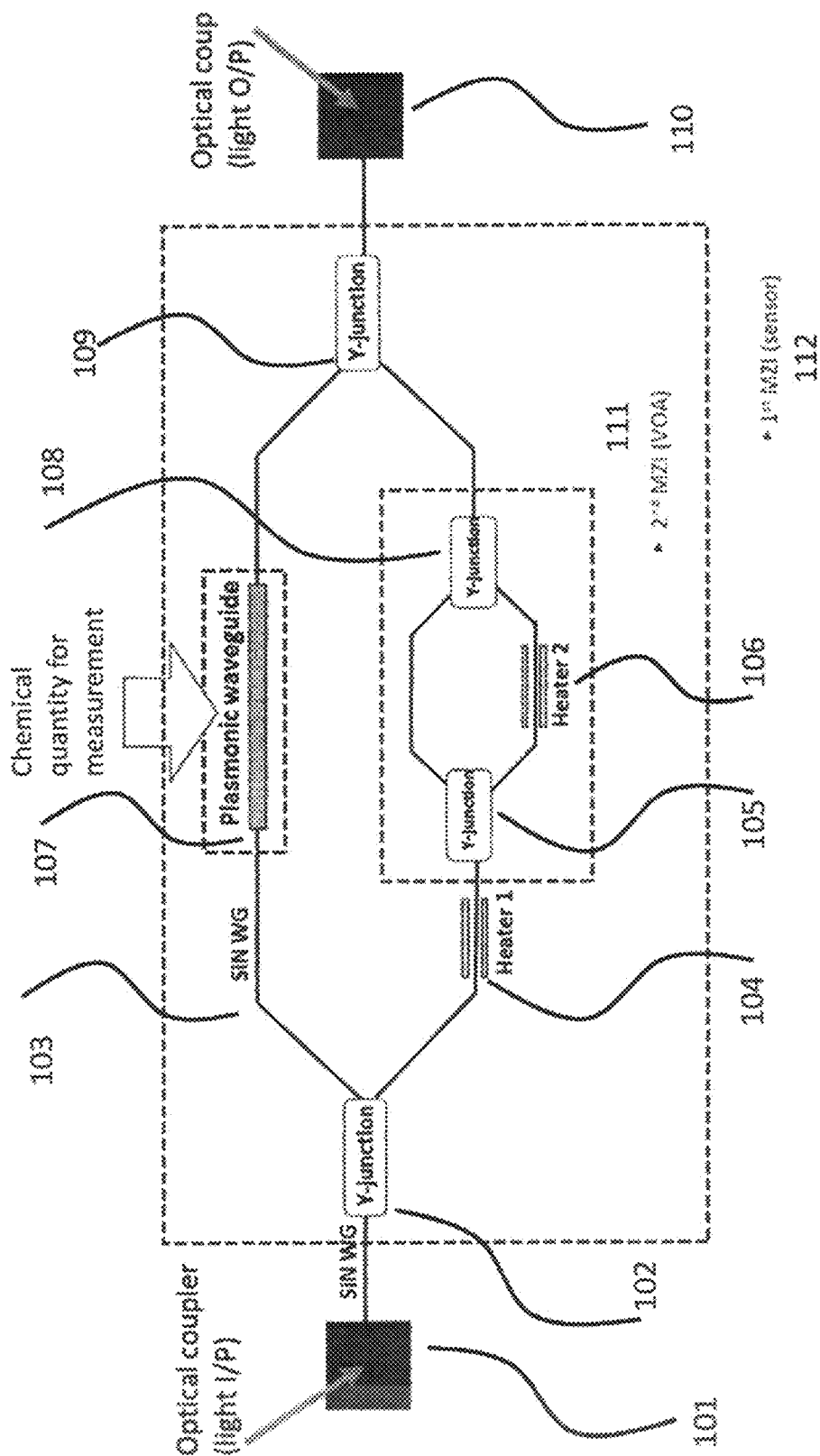
FIG. 1 shows a schematic diagram of the plasmo-photonic MZI-based biosensor circuit.
Figure 3:
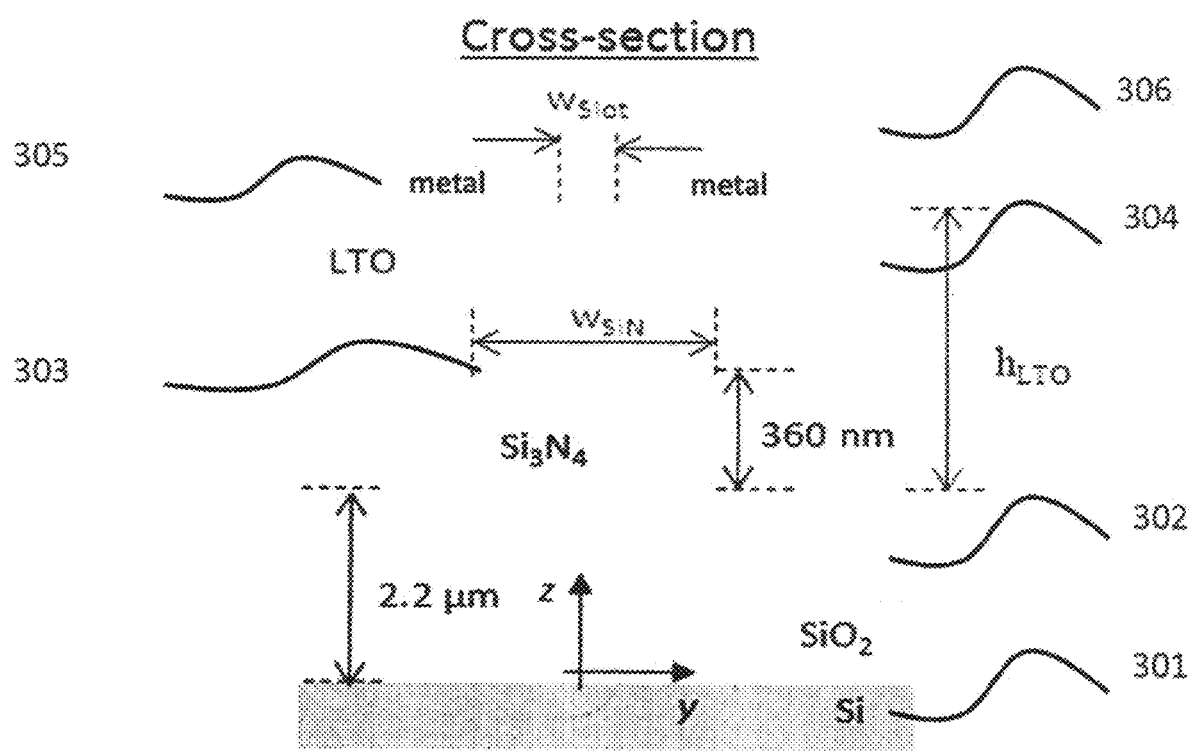
Figure 6:
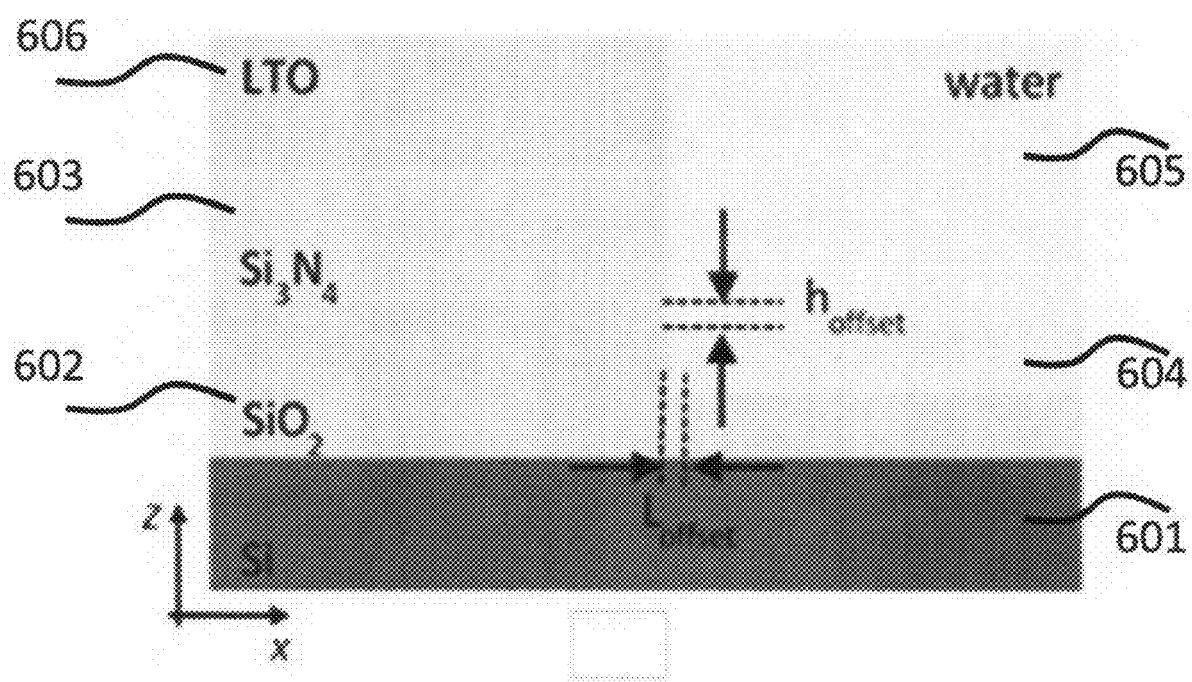

FIG. 1 shows an integrated sensor circuit, which comprises photonic waveguides using a high index silicon nitride strip sandwiched between a low index oxide substrate $SiO_2$ and a low index oxide superstrate LTO as shown in part in FIG. 3 with 301, 302, 303, 304 and in FIG. 6 with 601, 602, 603, 606. Said circuit further comprises Optical coupling structures at both ends 101, 110 of said sensor acting as the optical I/Os. It also comprises an optical splitter and combiner for optical splitting at the first junction 102 of said first MZI (sensor) and optical combining 109 at the second junction of said first MZI (sensor) 112. It can be a Y-junction or multi-mode interference coupler MMI.

Said circuit further includes a Variable optical attenuator VOA 111 by using an additional, actually second MZI, which is nested into the first MZI deploying an optical splitter 105 and an optical combiner 108 for optical splitting at the first junction of the second MZI and optical combining at the second junction of said second MZI.

It still further includes thermo-optic phase shifters 104, 106 to tune the phase of the optical signal in the reference arm of each MZI, i.e. said first sensor 112 and second VOA 111. Thermo-optic phase shifters are formed by depositing two metallic stripes parallel to each other on top of a section of the photonic waveguide and along the direction of propagation of light.

Figure 2:
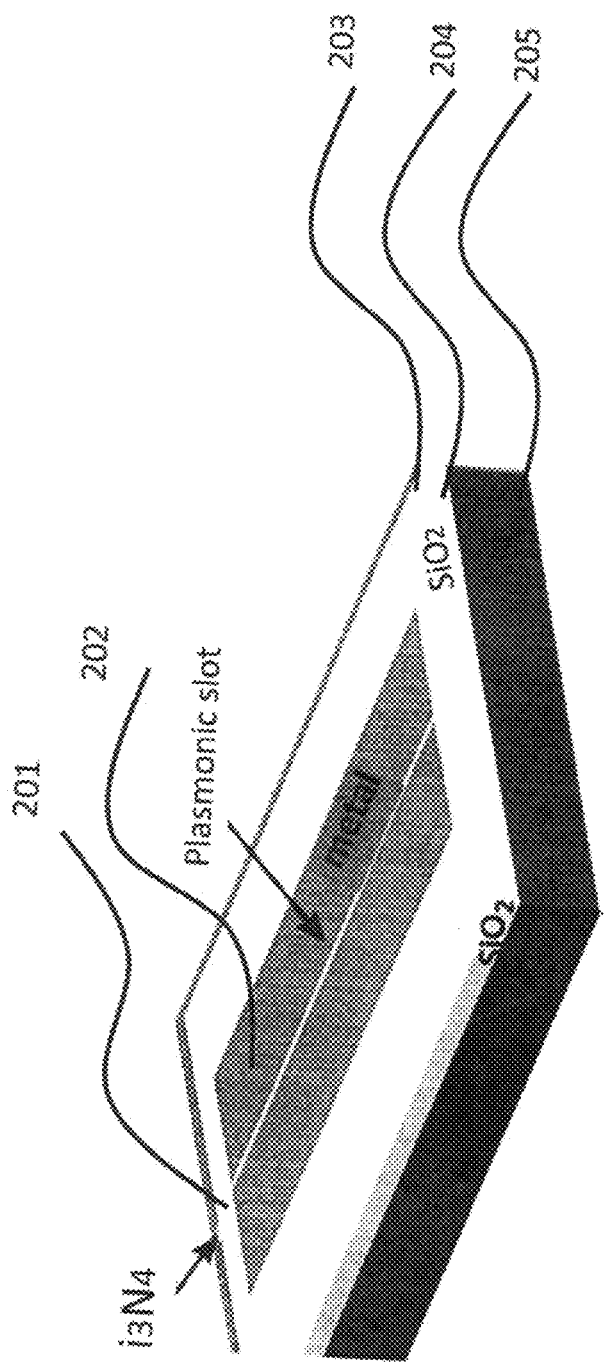
FIGS. 2, 3 and 4 shows a perspective view, a cross section and a side view respectively of the hybrid plasmo-photonic slot waveguide (HPPSW) used for the plasmonic section of the sensor and the thermo-optic phase shifters (heaters).
Figure 4:
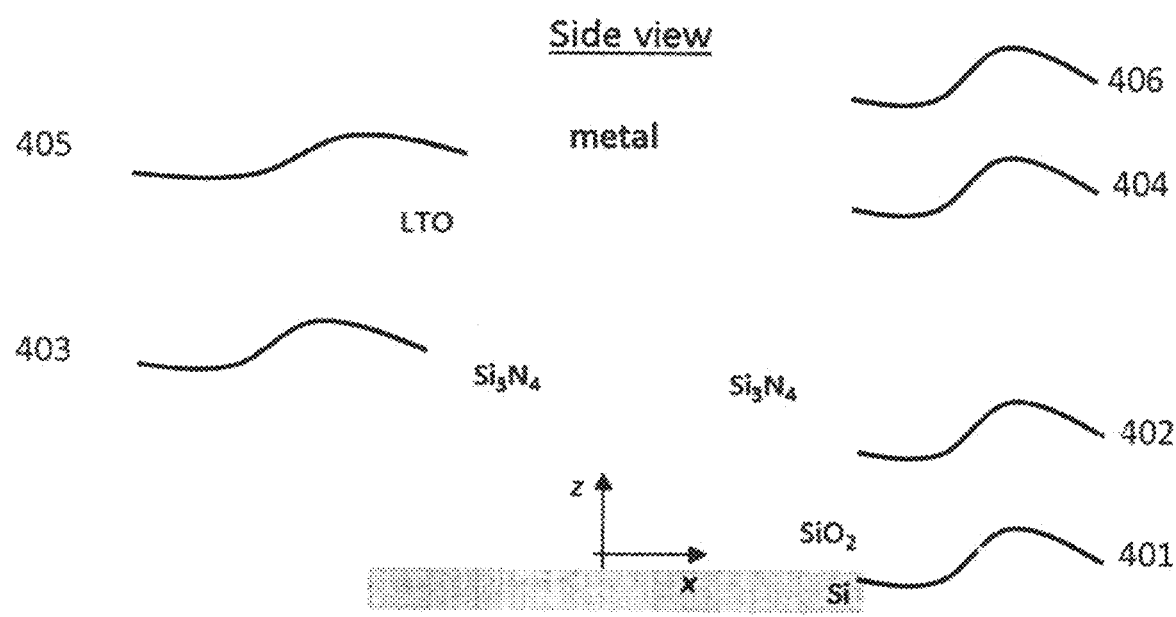
Figure 5:
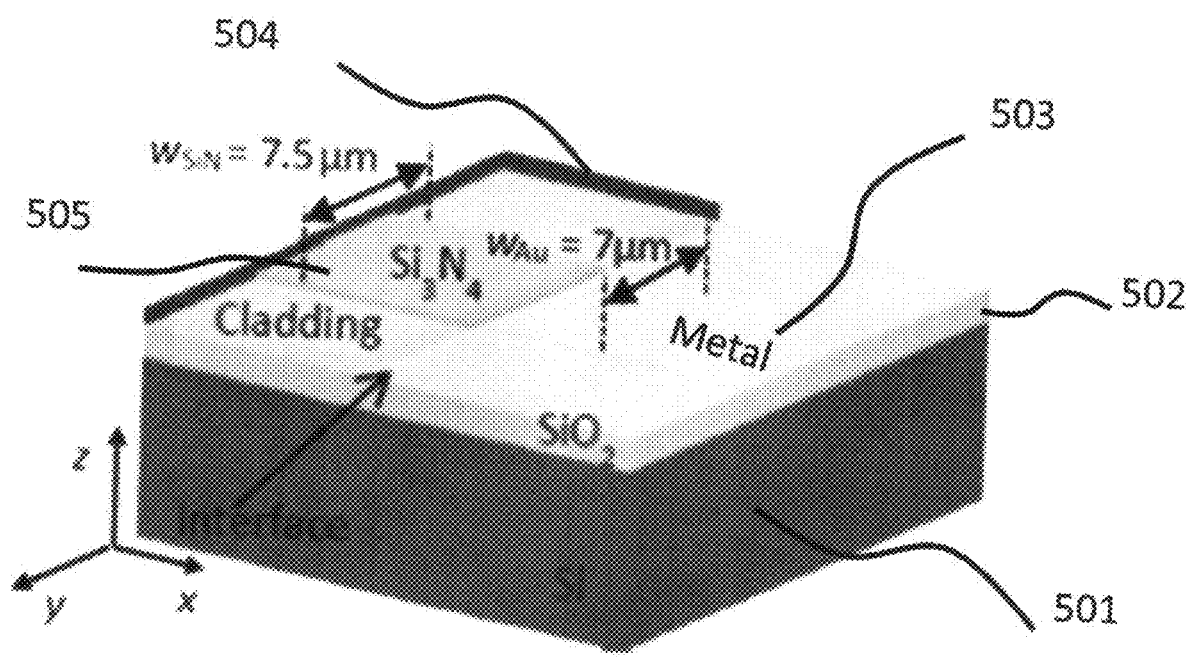
FIGS. 5 and 6 show a perspective view and a schematic side view respectively of the thin-film interface between the photonic and the thin-film plasmonic waveguide (TFPW) used for the plasmonic section of the sensor.

A plasmonic waveguide is further comprised therein as well, which is developed in the upper branch 103 of said first MZI that confines light propagation through coupling to Surface Plasmon Polaritons SPP at the metal-analyte interface. The plasmonic waveguides can be implemented with noble metals, such as gold (Au) or silver (Ag), and low-cost metals, such as copper (Cu), aluminum (Al), titanium nitride (TiN) or other CMOS compatible metal. The plasmonic waveguides can be implemented with either of the following two waveguides: firstly a so-called Thin-film waveguide TFW that comprises a thin metallic stripe deposited directly onto the oxide superstrate with the aid of a cavity formed by etching the top oxide cladding and the silicon nitride core of the photonic waveguide in that section only, as shown in FIG. 5; or the waveguide may also consist of a so-called "Hybrid plasmo-photonic slot waveguide" HPPSW that comprises two parallel metallic wires deposited directly on top of a predefined section of the waveguide without the need for a cavity or additional processing steps, as shown in FIG. 2. In this case, the photonic waveguide underneath the metallic stripes is interrupted during lithography without requiring additional mask or processing steps. The plasmonic slot and phase shifters can be deposited directly on top of the photonic waveguides and at a single step providing an even lower cost version of the sensor, and consequently no etching of the photonic waveguide, yielding a single metal layer deposition step, as shown in FIG. 4. Values of the separation of the metals stripes represented by the distance $W_{slot}$, and the metal stripes length and width can be defined during the mask design of the sensor in order to design both the HPPSW and the thermo-optic phase shifter (heaters), in a single mask. Directional coupling is exploited to couple light from the photonic waveguide to the plasmonic slot and back to the photonic waveguide. Plasmonic taper at the front and rear-end of the plasmonic slot of FIG. 2 can also be used for improved coupling efficiency.

TABLE 1

|  | FSR: 100 nm | FSR: 200 nm | FSR: 300 nm | FSR: 1164 nm |
|---|---|---|---|---|
| Sensitivity (thin-film) | 6,392 nm/RIU | 12,701 nm/RIU | 22,133 nm/RIU | 162,000 nm/RIU |
|  | FSR: 110 nm | FSR: 210 nm | FSR: 330 nm | FSR: 1070 nm |
| Sensitivity (hybrid slot) | 552 nm/RIU | 1,037 nm/RIU | 1,658 nm/RIU | 11,792 nm/RIU |

Table 1 shows how sensitivities are increased with increasing FSR measured for TFPW and HPPSW in optimally biased MZIs when material dispersion is omitted.

Photonic and plasmonic waveguide components are described hereafter. The photonic waveguide deployed here is based on a stoichiometric $Si_3N_4$ technology with a cross-sectional dimension of 360×800 nm and supports two guided photonic modes of interest at 1550 nm optical wavelength at polarization TM and polarization TE. However, other dimensions of the photonic waveguide that may support the transition of the optical modes to the plasmonic waveguides can also be used.

Based on this waveguide structure and said two types of plasmonic waveguides, photonic-to-plasmonic interfaces are deployed in two aspects of this invention. The first concerns a photonic-to-plasmonic mode transition based on a butt-coupling scenario for thin-film plasmonic waveguides (TFW) as shown in FIG. 5 and FIG. 6 that requires TM polarized light and the second one regards a transition based on the directional coupling scheme for hybrid plasmonic slot waveguides (HPPSW) as shown in FIGS. 2, 3 and 4 that requires TE polarized light. In both cases, the photonic structure is a Si3N4 rectangular waveguide with dimensions that have been carefully chosen so that it can provide the necessary coupling mechanism and simultaneously comply with fabrication restrictions.

For the hybrid slot waveguide, the directional coupling mechanism is exploited, following the hybrid nature of the utilized waveguide. This hybrid waveguide can support modes, notably with field distributions both in its plasmonic and its photonic part, which if properly designed can exhibit quasi even or odd symmetry. The power exchange can be then considered as the result of the beating between these two modes. FIG. 3 shows the cross section of this waveguide configuration, which consists of a $Si_3N_4$ bus waveguide—photonic part—and a metal-based slot—plasmonic part—located above the $Si_3N_4$ waveguide. Between the two waveguides, i.e. photonic and plasmonic, there is a layer of a low temperature oxide (LTO) acting as the cladding of the photonic waveguides and as the spacer at the hybrid slot waveguide.

The hybrid waveguide can support modes with field distribution both in its plasmonic and its photonic part. 2D eigenvalue analysis has given all the possible geometrical parameter combinations so that hybrid modes with even and odd symmetry can be supported. After a thorough investigation, the appropriate geometry setup has been chosen, e.g. $w_{slot}$=200 nm, $Si_3N_4$ width: $w_{SiN}$=700 nm and LTO thickness: $h_{LTO}$=660 nm in total), so that not only the modes of interest exhibit the necessary symmetry but also lead to a small coupling length. In this context, the approximate coupling length needed to efficiently transfer the power from the plasmonic to the photonic part has been estimated around 7 µm. Dimensions may vary depending on the simulation tools and parameters.

3D FDTD electromagnetic simulations was used to verify the results and aiming at fine-tuning the geometrical setup concurrently minimizing the beating length—and consequently the overlapping coupling area—and maximizing the power transition from the photonic to the plasmonic part, and backwards. In this 3D geometry model, the hybrid waveguide of interest is excited by a TE photonic mode and the $Si_3N_4$ bus waveguide is interrupted after a length of 7 µm (Lc). This interruption, represented by plane A in FIG. 4 proved beneficial in terms of coupling efficiency, since it prevents any minor power leakage to the photonic part. According to FDTD simulations, such a hybrid configuration can efficiently transfer the light from the photonic to the plasmonic part, and backwards, with efficiencies that can reach 68% per transition when using gold as the metal. Photonic tapers are deployed for matching the photonic mode from the optical waveguide to the mode of the plasmonic waveguide.

The same design procedure can be followed utilizing CMOS metals for the hybrid slot waveguide component. Since the only part that was modified for this purpose is the metal slot, the two-step analysis that was previously presented has been repeated: a hybrid structure similar to the one shown in FIG. 2 has been analyzed through 2D eigenmode analysis. The two even and odd symmetrical modes have been detected and the necessary coupling length has been calculated. Then, the whole waveguide structure was simulated through a 3D FDTD model in order to estimate the coupling efficiency from the photonic to the plasmonic part, and backwards. As it was expected, by exciting the photonic part of this hybrid structure with the TE polarized $Si_3N_4$ mode of interest and interrupting the $Si_3N_4$ bus waveguide after a length of $L_c$=6 µm, the light can be efficiently transferred from the photonic to the plasmonic part with power efficiencies of at least 60% when using Al and 74% when using Cu.

In the aspect of the invention that uses the HPPSW as the sensing plasmonic waveguide, the plasmonic waveguide and the heaters in the sensor chip can be simultaneously deposited on the same level of the material stack of the chip as the last stage of the manufacturing process in a single metal layer simplifying fabrication and reducing fabrication costs of the sensor. It is to be noted that the oxide separation layer remains the same for both the HPPSW and the heater structures.

In this photonic-to-plasmonic interface configuration for a thin film waveguide shown in FIGS. 5 and 6, the coupling mechanism between the photonic and the plasmonic waveguide is based on the spatial matching of the two modes of interest. For this purpose, a butt-coupling scheme including a photonic $Si_3N_4$ waveguide and a plasmonic Au-based thin-film structure has been adopted. The two waveguide structures are placed so that the input level of the one coincides with the output of the other. The design process aims to detect the exact geometrical parameters of each waveguide so that the light can pass efficiently from the photonic to the plasmonic part and vice versa. Towards this direction, at first, the two waveguides have been analyzed separately in terms of 2D eigenvalue analysis. After choosing the two eigenmodes of interest by matching each other in terms of polarization, for which TM polarization is needed, and field distribution, a parametrical analysis based on the calculation of power overlap integrals has been utilized to get a first indicative estimation for the power coupling capabilities of this configuration. This estimation has been verified in a second step through 3D FDTD simulations.

The thin-film plasmonic waveguide comprises a thin metallic film placed above a $SiO_2$ layer and water as the top cladding material to optimally mimic the biosensing application environment. The investigation began with the 2D eigenvalue analysis of this plasmonic component. This configuration is capable of supporting a plasmonic mode mostly concentrated on the metal-cladding interface, with modal characteristics that are strongly dependent on the geometry of the metal stripe and the cladding material. FIGS. 5 and 6 depict the geometry of this waveguide in perspective and in side-view.

For the photonic-to-plasmonic interface, the $Si_3N_4$ photonic waveguide has been analyzed separately to investigate the characteristics of the photonic TM mode of interest, notably polarization, field profile. Then, both the eigenvalue analyses—$Si_3N_4$ and thin-film waveguide—were taken into account and the geometrical setups for both components have been carefully selected to satisfy modal match, both spatially and in terms of polarization. A step further, these two waveguide structures have been combined in a butt-coupling setup as the one shown in FIGS. 5 and 6. The 3D model of the single transition from a photonic to a plasmonic component has been analyzed through 3D FDTD simulations. By appropriately adjusting the two waveguide dimensions, it was shown that one can maximize the power transfer from the photonic to the plasmonic mode, and vice versa. More specifically, after a thorough investigation in terms of power overlap integrals calculation, the cross-sectional dimensions of the two waveguides of interest have been set to 360 nm×7.5 μm and 100 nm×7 μm for the $Si_3N_4$ and the metal film, respectively. Then, their exact location in the interface setup with $h_{offset}$ as vertical offset and $L_{offset}$ as lateral offset in FIG. 6, has been investigated to maximize the coupling efficiency. Numerical simulations showed that for a vertical offset of the order of 400 nm, a maximum coupling efficiency around 64% can be achieved when using gold as the thin-film metal.

CMOS metals may be used instead of gold to ease mass manufacturing of the biosensor chip. Results showed that the light transfer ratio (coupling efficiency) from the photonic to the plasmonic part can reach 60% and 68% when using Al and Cu respectively. TiN or other CMOS compatible metal compounds can be used instead as well.

Similarly to the hybrid waveguide and to complete this photonic-to-plasmonic interface, a photonic taper using prior art techniques was also designed and used in order to adjust the $Si_3N_4$ width from 800 nm to 7.5 μm.

Other examples of oxide materials for the top cladding of the photonic waveguide are LTO, $SiO_2$, SU8 or other oxides with similar optical properties for all aspects of this invention.

The complete sensor with all above components can be monolithically integrated on a single chip and by using large CMOS wafers and electronics IC fabs to reduce the cost of each sensor chip while offering disruptive sensitivity performance. Alternatively, in the aspect of the invention where gold or silver are used for the plasmonic waveguides, an additional metal deposition process is required outside CMOS plants or within specially made sections of the CMOS plants that may offer deposition processes for gold or silver.

As to a sensor design methodology, in the current invention, the effective index of the plasmonic waveguide depends on the concentration of the targeted substances in the tested liquid or gas that bind to the plasmonic waveguide with the aid of known surface functionalization methods. Change of the effective index of the plasmonic waveguide results in a shift of the spectral resonances of the MZI sensor. The resonance shift versus the refractive index change of the liquid determines the sensitivity of the biosensor. The bulk sensitivity of the sensor is calculated by using the following formula[1]

$$S_{bulk} = \frac{d\lambda}{dn_{liq}} = \frac{d\lambda}{dn_{eff}} \cdot \frac{dn_{eff}}{dn_{liq}} \tag{1}$$

where $\lambda$ is the wavelength of the optical signal, $n_{liq}$ is the refractive index of the applied liquid and $n_{eff}$ is the mode effective index in the plasmonic waveguide, being referred to Xu Sun et al's "High Sensitivity liquid refractive index sensor based on a Mach-Zehnder interferometer with a double-slot hybrid plasmonic waveguide", OSA Optics Express, Vol. 3, No 20, 2015.

Plasmonic waveguides maximize the second term since most of the electric field of the optical mode is travelling in the water-metal interface of the plasmonic waveguide whereas in photonic sensing waveguides the spatial overlap between the evanescent field of the optical mode and the analyte under test is much less.

The first term of equation 1 is maximized by optimally biasing the interferometer by using the embodiments, with all components described above, described already herein. Specifically, once the optical paths between the MZ branches are designed for a specific FSR, then the optimization of the biasing of the disclosed sensor is achieved by using Heater 1 and Heater 2 106 in MZI2 111 as shown in FIG. 1.

Heater 2 in FIG. 1 is included in order to optimize the optical path of the lower branch, so that a relative phase change between light of upper and lower branch is a multiple of $2\pi$ radians for the specific wavelength of operation. In parallel, heater 1 is used to readjust the optical path difference after fabrication errors introduced during the manufacturing process. This is achieved by applying electrical power, i.e. DC voltage, to both metallic stripes if the heater 1. An optical power meter is required to monitor the optical path difference between the MZI upper and lower branches such as an expert in the field is aware of.

Heater 1 in FIG. 1 is included in MZI 2 in order to optimize the optical power at the lower branch so that optical losses of the lower branch are equal to the optical losses of the upper branch. MZI 2 operates as variable optical attenuator VOA that is used to balance the optical power at the two branches of the MZI. This is achieved by applying electrical power (DC voltage) to both metallic stripes of the heater 2. Equal losses at both branches will result in maximum extinction ratio of the interferometer as an expert in the field is aware of, effectively increasing the sensitivity (resolution) of the sensing measurement.

Figure 7:
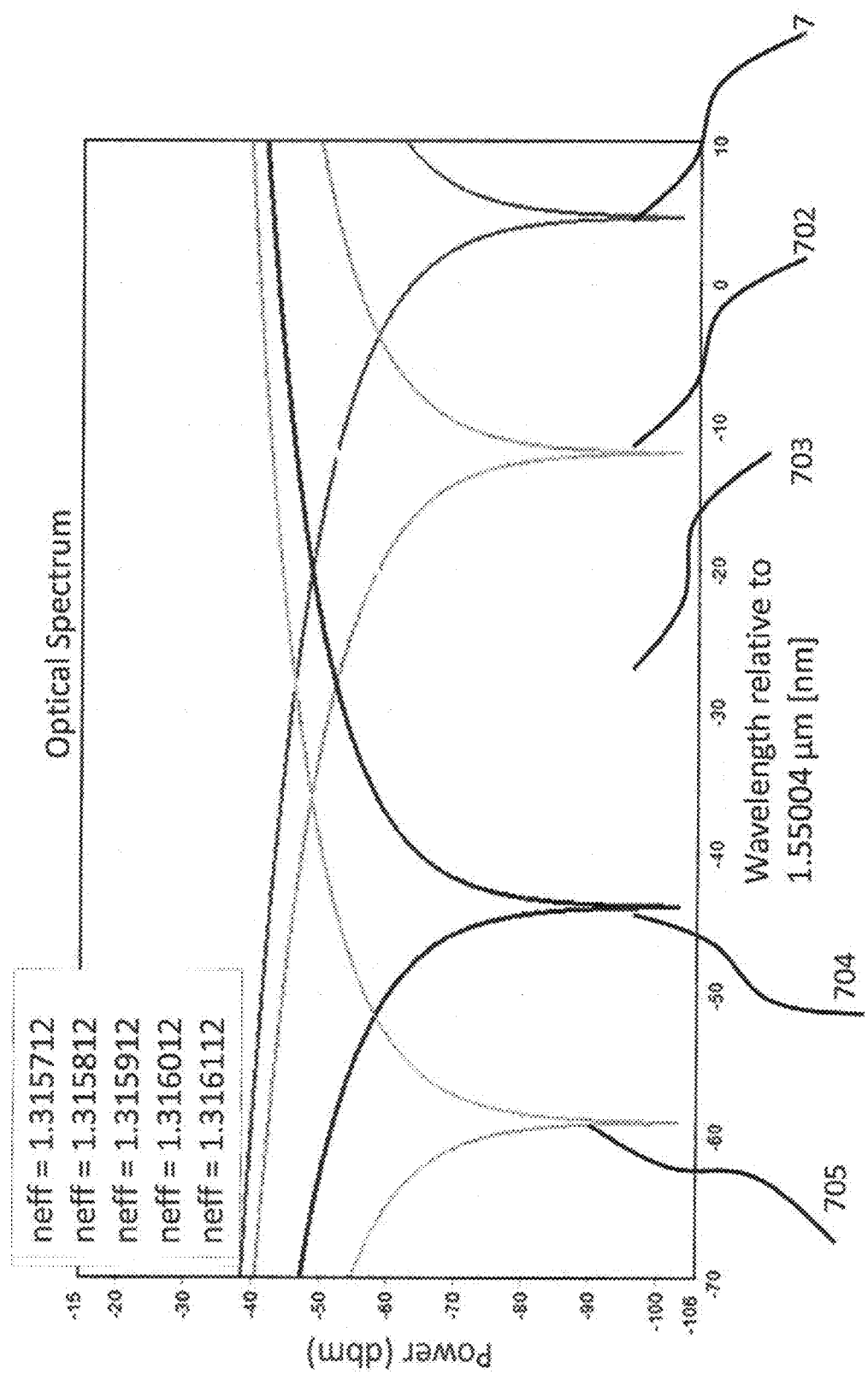
Figure 8:
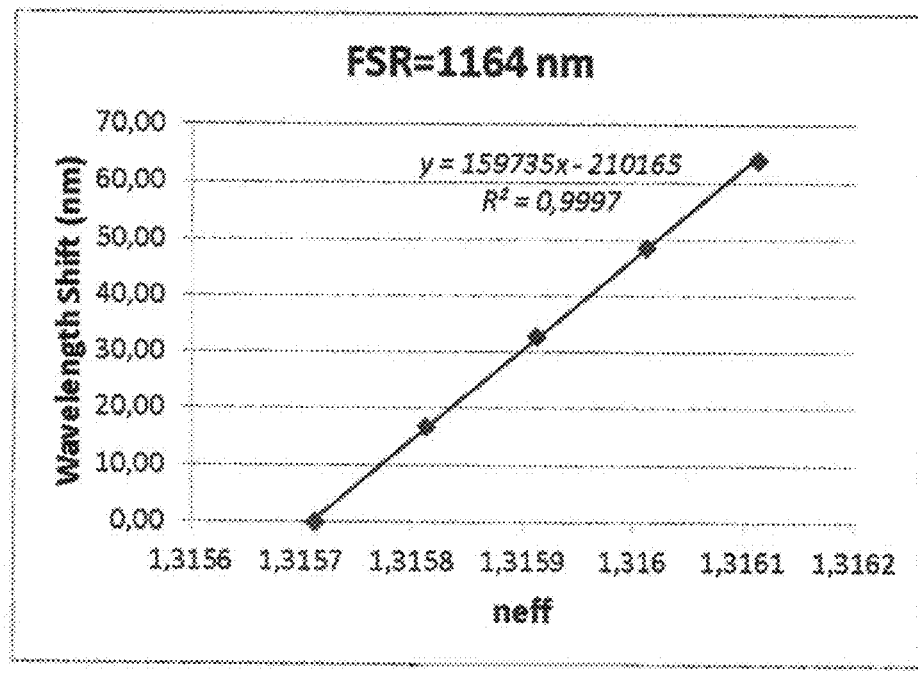
FIGS. 8 and 9 represent the first and the second factor of eq. 1 respectively and used to measure the optical sensitivity of the biosensor.
Figure 9:
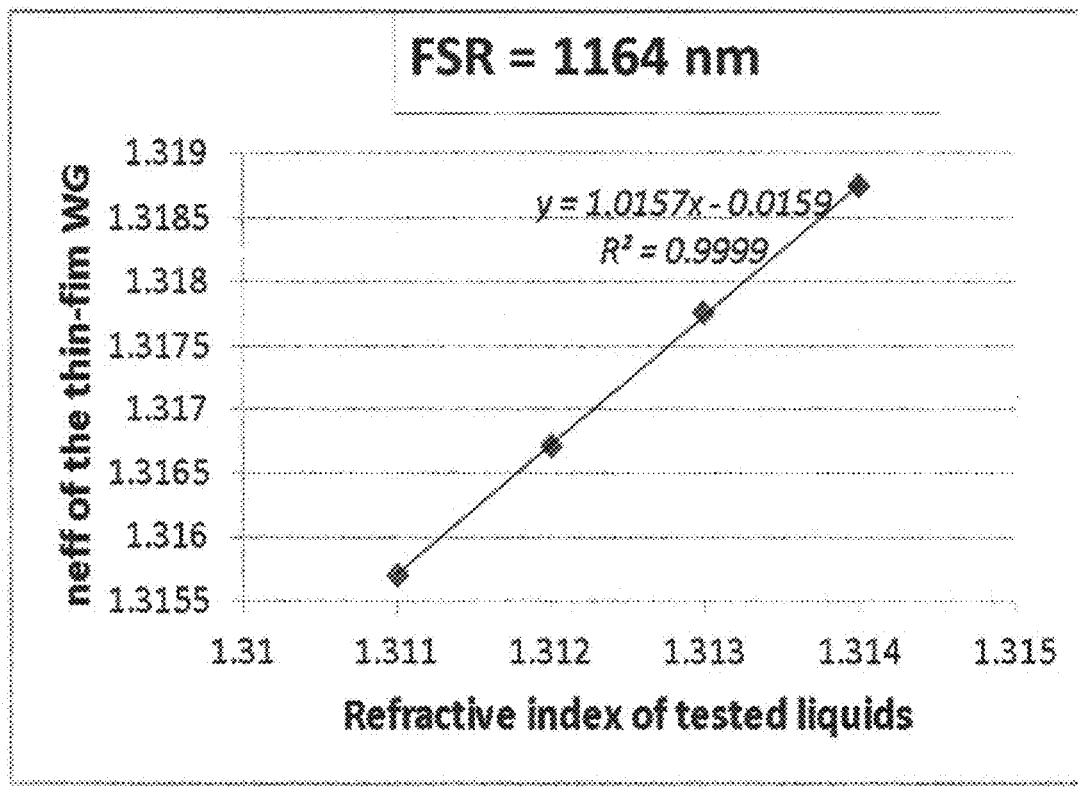

Once principal DC voltages are identified for balancing the interferometer in Heater 1 and Heater 2, these should be then fine adjusted in an iterative method between the 2 DC voltages in order to fully optimize the biasing of the interferometer. Once this is achieved, a wavelength resonance is obtained 701 at the MZI1 output 110. Then, the analyte under test is attached on the plasmonic waveguides 107 via prior art methods, e.g. fluidic chambers or manually, and the interferometer resonance is measured at the output of the sensor and resonance shifting in the optical spectrum is measured as shown in FIG. 7. The resonance shifting 702-705 depends on the change of the refractive index of the analyte under test. For such a measurement, the first and second terms of eq. 1 are plotted in FIGS. 8 and 9 to conclude with the overall sensitivity values of the sensor device.

With this method, and by using equation 1 for a 1164 nm FSR sensor circuit, sensitivity of 162,000 nm/RIU is achieved by using the TFW and 11,792 nm/RIU by using the HPPSW using numerical modeling tools. Smaller or even larger FSRs can be achieved, i.e. smaller or larger sensitivities, by designing the optical path differences accordingly and by following the same optimization method of the disclosed sensor.

In addition, a sensor measuring method is provided as well. Three different interrogation methods may be used to measure refractive index change in the disclosed device:
a first one consisting of a Spectral shift measurement of the first MZI resonance using tunable laser and power meter: a tunable laser source is required as the optical source at the input of the sensor and a power meter is required at the output of the sensor. A change of the spectral response of the sensor before and after the application of the analyte on the plasmonic waveguide will show the spectral shifting of the resonance as an expert in the field is aware of;
a further one consisting of a Spectral shift measurement of the first MZI resonance using a broadband optical source and an optical spectrum analyser: A broadband optical source like a white source, LED or arrays of LEDs or any other type of broadband source is required as the optical source at the input of the sensor and a spectrum analyser is required at the output of the sensor. A change of the spectral response of the sensor before and after the application of the analyte on the plasmonic waveguide will show the spectral shifting of the resonance as an expert in the field is aware of;
a still further one consisting of a Phase shift measurement at the plasmonic waveguide using a single wavelength source: For the same FSRs as above one could directly correlate refractive index change to phase shift by injecting a single wavelength light at the sensor input and measuring the optical power at the output of the first MZI with the aid of a power meter. Sinusoidal power fluctuations versus time provide phase shift in radians as an expert in the field is aware of.

Another aspect of this invention consists of a multiplexed MZI configuration and wavelength selective optical filters in order to achieve simultaneous detection of multiple substances using the same chip, also referred to as multichannel sensing. The embodiment described above is combined as shown in FIG. 10 to address the detection of three substances simultaneously.

Figure 10:
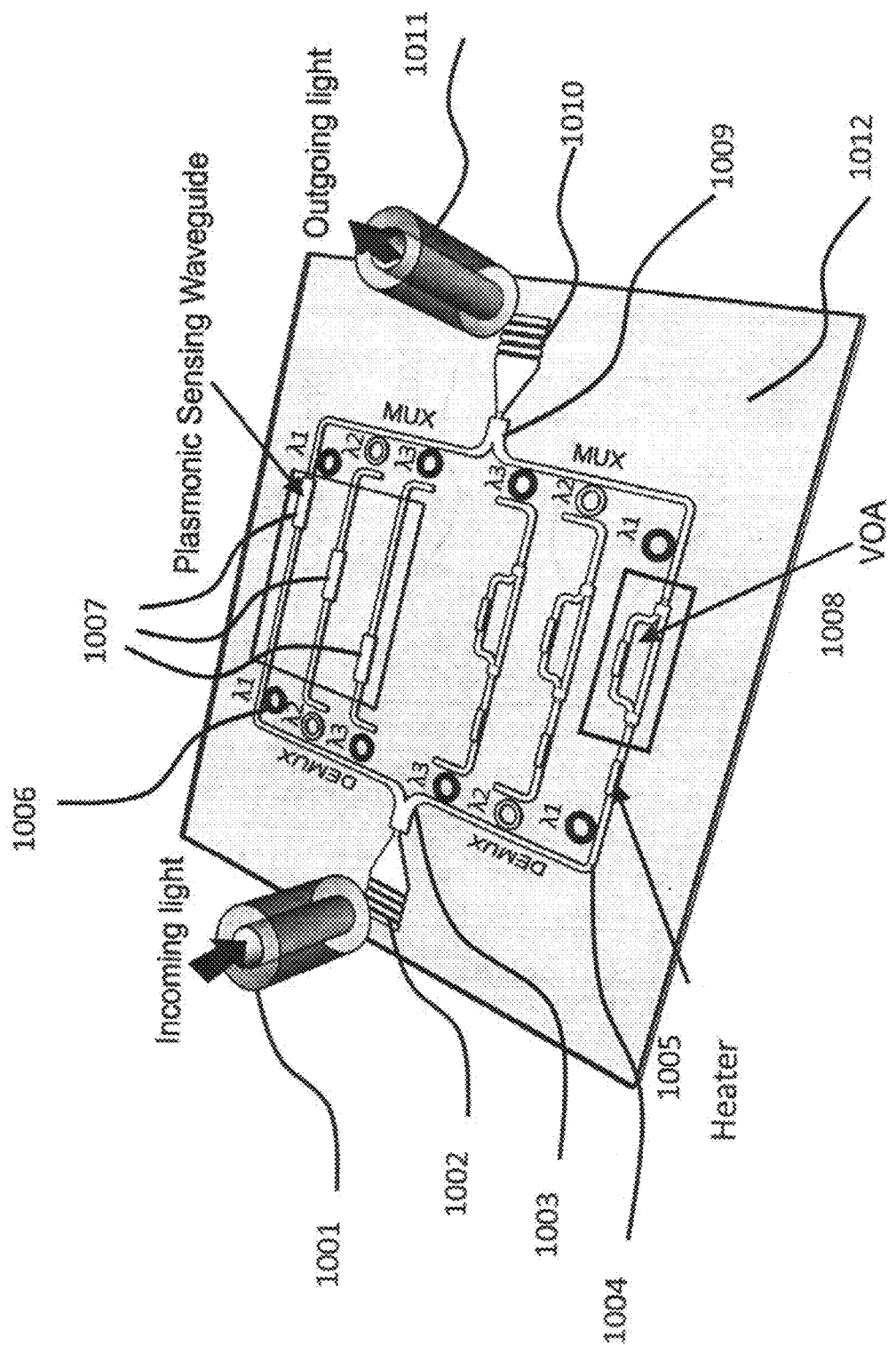
FIG. 10 shows the schematic diagram of the multichannel biosensor configuration using multiplexed MZI sensors, optical filters and WDM for parallelization of multiple optical signals (wavelengths). Each optical wavelength is used by a single MZI sensor.

Three nested MZI sensors as shown in FIG. 10 using the embodiments above comprise three upper branches with plasmonic waveguides 1007 and three copies of lower branches with heaters 1005 and VOAs 1008 as described in previous embodiments. A common optical splitter and a common combiner at input and output of the chip respectively are used for all three MZIs. Each MZI sensor uses a separate wavelength out of three wavelengths that are simultaneously injected in the biosensor through the optical splitter 1003. Each MZI also comprises of optical filters 1006 at the input of its branches and after the input splitter to select its wavelength of operation from the incoming optical signals. Ring resonators common to prior art can be used as the optical filters or other optical filters with similar functionality.

Another aspect of this embodiment is the deployment of a WDM multiplexer instead of the input common coupler and the optical filters such as arrayed waveguide grating AWG, Bragg grating-based multiplexers or other WDM multiplexer with similar functionality.

More sensing channels can be integrated on a single chip depending on the user requirements and chip footprint.

The invention claimed is:
1. Device comprising at least one optical interferometric sensor, a first Mach-Zehnder (211) interferometric sensor (MZI1) with a (FSR) free spectral range from a few 10s of nanometers to several 100s of nanometers, wherein a plasmonic waveguide (107) is incorporated as a transducer element planar integrated on $Si_3N_4$ photonic waveguides
    a set of Photonic waveguides (103) with a high index silicon nitride strip (303, 603), which is sandwiched between a low index oxide substrate and a low index oxide superstrate,
    Optical coupling structures (102, 109) at both ends of the sensor acting as optical I/Os:
    an Optical splitter (102) and an optical combiner (109) for optical splitting at a first junction (102) of said MZI sensor (MZI1) and optical combining a second junction (109) of said MZI sensor (MZI1); and
    a plasmonic waveguide (107) developed in an upper branch (103) of said MZI sensor (MZI1), that confines light propagation through coupling to Surface Plasmon Polaritons (SPP) at a metal-analyte interface,
wherein it comprises an additional optical interferometric element, a second interferometer of the Mach-Zehnder type (MZI2) being arranged in a reference arm of said first MZI interferometric sensor (MZI1), both said MZIs Mach-Zehnder interferometers (MZI1) and (MZI2) comprising thermo-optic heaters (104, 106) for optimally biasing said interferometers (MZI1) and (MZI2) as variable optical attenuator;
further comprising an overall chip (112),
    a variable optical attenuator (VOA) with said additional Mach-Zehnder interferometer (MZI2) deploying an optical splitter and an optical combiner for optical splitting at the first junction of said additional MZI Mach-Zehnder interferometer (MZI2), and optical combining at a second junction of said additional MZI Mach-Zehnder interferometer (MZI2),
    a set of Thermo-optic phase shifters (104, 106) to tune the phase of the optical signal in the reference arm (104, 106) of each said MZI Mach-Zehnder interferometer (MZI1, MZI2-VOA);

wherein said Thermo-optic phase shifters are formed by depositing two metallic stripes parallel to each other on top of a section of the set of photonic waveguides and along the direction of propagation of light.

2. Device according to claim 1, wherein said one optical interferometric sensor consists of a first Mach-Zehnder (211) interferometric sensor (MZI1), with a FSR ranging from a few tens of nanometers several hundreds of nanometers, and in that said additional optical interferometric element, comprises a second interferometer of the Mach-Zehnder type (MZI22) being arranged in said reference arm of said first interferometer sensor (MZI1).

3. Device according to claim 1 wherein said plasmonic waveguide is made with noble metals, gold (Au) or silver (Ag).

4. Device according to claim 1, wherein said plasmonic waveguide is made with copper (Cu), aluminum (Al), or titanium nitride (TiN) or another CMOS compatible metal.

5. Device according to claim 1, wherein said plasmonic waveguide (107), includes a thin-film or hybrid slot.

6. Device according to claim 5, wherein said plasmonic waveguide is made with the following waveguide comprising of a so-called Thin-film waveguide (TFW) that comprises a thin metallic stripe deposited directly onto the oxide superstrate with the aid of a cavity formed by etching the top oxide cladding and the silicon nitride core of the photonic waveguide in that section only.

7. Device according to claim 5, wherein said plasmonic waveguide is made with a so-called Hybrid plasmo-photonic slot waveguide (HPPSW) that comprises two parallel metallic wires (202, 305) deposited directly on top of a predefined section of the waveguide (405) without the need for a cavity or additional processing steps, wherein the photonic waveguide underneath metallic strips (303, 403) is interrupted during lithography without additional mask or processing steps, wherein a plasmonic slot (202, 107) and phase shifters (104) are deposited directly on top of the photonic waveguides (103, 303, 403) and at a single step without etching of the photonic waveguide and with single metal layer deposition step, wherein Values of the separation of metal stripes, at distance Wslot, and the metal stripes length and width are defined during the mask design of the sensor in order to design both the HPPSW and the thermo-optic phase shifter, respectively heater (104) in a single mask, wherein Directional coupling is included to couple light from the photonic waveguide (101, 303, 403) to the plasmonic slot (202, 305, 405) and back to the photonic waveguide (103, 303, 403), wherein Plasmonic taper at the front and rear-end of the plasmonic slot (202, 305, 405) are also used for improved coupling efficiency.

8. Device according to claim 1, wherein said high index silicon nitride strip (303, 603) of said plasmonic waveguides is sandwiched between a low index oxide substrate and an LTO substrate as low index oxide superstrate.

9. Device according to claim 1, wherein said high index silicon nitride strip (303, 603) is sandwiched between other oxides.

10. Device according to claim 1 wherein it is made with CMOS compatible photonic materials, Si and Silicon-on-Insulator (SOI), $TiO_2$.

11. Device according to claim 1, wherein it is made with CMOS compatible metal materials, Al, Cu, TiN, or compounds of those materials.

12. Device according to claim 1, wherein the device includes bidirectional vertical optical grating couplers that are arranged as optical I/Os and splitter combiner of said first MZI sensor (MZI1) to simultaneously act as vertical I/Os and splitter combiner of said first MZI sensor (MZI1).

13. An apparatus comprising arrays of devices as defined in claim 1 for concurrently detecting multiple substances on the same chip, wherein said apparatus comprises multiples of the upper branches with plasmonic waveguides and the same copies of lower branches with heaters and VOAs, wherein a common optical splitter and a common combiner are arranged at the input and output of the chip respectively for all said MZIs Mach-Zehnder interferometers, wherein each MZI Mach-Zehnder interferometer uses a separate wavelength out of equal number of wavelengths that are simultaneously injected in the sensor through the optical splitter, wherein each MZI Mach-Zehnder interferometer also comprises of optical filters at the input of its branches and after the input splitter to select its wavelength of operation from the incoming optical signals, wherein said optical filters, or other optical filters are ring resonators.

14. The apparatus according to claim 13, wherein integrated optical sources, VCSELs, LEDs, broadband sources or other optical sources and optical photodetectors, are arranged at the inputs and outputs of the devices respectively, wherein the optical source and photodetectors are integrated using flip-chip or wafer bonding or die bonding or epitaxial growth methods above a grating coupler or on the same level of the photonic waveguide.

15. The apparatus according to claim 13, wherein arrays of integrated optical sources and optical detectors are arranged at the inputs and outputs of the devices, wherein the optical source and photodetectors are integrated using flip-chip or wafer bonding or die bonding or epitaxial growth methods above a grating coupler or on the same level of the photonic waveguide.

16. The apparatus according claim 13, it comprises vertical electrical vias also known as TSVs, which are connected to and electrically control the thermo-optic phase shifters by an electronic circuit 3D integrated on the same chip.

17. The apparatus according to claim 13, wherein it comprises a fluidic channel, which is attached on the surface of the plasmonic waveguide to flow a predetermined solution/analyte on the plasmonic transducer element.

18. The apparatus according to claim 13, wherein capture layers are generated at the surface of the plasmonic transducer for detection of specific biological and/or chemical substances and/or molecules.

19. Method for use of the device according to claim 13, wherein unfunctionalized plasmonic waveguides of the same dimensions are fabricated on the lower branch of said sensor (MZI1) or respective equivalent in the said MZI array respectively, wherein a targeted analyte is guided to flow over this additional waveguide similarly to a functionalized waveguide on the top branch of said sensor (MZI1) and wherein unwanted binding or noise is eliminated.

20. Method for use of the device according to claim 13, wherein it comprises the following steps additionally:
optimally biasing said interferometers (MZI) as variable optical attenuator by said thermo-optic heaters comprised in both said interferometers of the Mach-Zehnder type,
deploying an optical splitter and an optical combiner for optical splitting at the first junction of said second MZI2, by a variable optical attenuator (VOA) with said second MZI (MZI2) is nested into said first sensor (MZI1), and optically combining at the second junction of said second MZI (MZI2), tuning the phase of the optical signal in the reference arm of each said MZI (MZI1, MZI2)-(VOA) by said thermo-optic phase shifters; depositing two metallic stripes parallel to each other on top of a section of the photonic waveguide and along the direction of propagation of light, whereby thermo-optic phase shifters are formed;

by which said additional optical interferometer (MZI2) nested into said first optical interferometric sensor, having the thermo-optic phase shifter in its reference arm, acts as variable optical attenuator (VOA), which is controlled by the driving signal of the thermo-optic phase shifter, wherein this (VOA) controls the intensity of the signal in said reference arm of the first interferometric sensor, whereas said additional thermo-optic shifter in the reference arm of the first interferometric sensor allows to control the phase of the beam in said reference arm, thus allowing the control and amplitude of the field in the reference arm of the interferometer (MZI1), so that said interferometer (MZI1) sensor may be balanced and biased by electrical signals.

21. The device according to claim 1 wherein the low index substrate is SiO2 and the low index superstrate is LTO.

22. The device according to claim 1 wherein the second junction (109) is a Y junction directional coupler or a multi-mode interference coupler.

* * * * *